United States Patent [19]
Cole

[11] Patent Number: 5,402,823
[45] Date of Patent: Apr. 4, 1995

[54] PINCH VALVE
[75] Inventor: George S. Cole, Pebble Beach, Calif.
[73] Assignee: George S. Cole & Associates, Incorporated, Thousand Oaks, Calif.
[21] Appl. No.: 986,610
[22] Filed: Dec. 7, 1992
[51] Int. Cl.⁶ .............................................. F16K 7/06
[52] U.S. Cl. ....................................... 137/594; 251/9
[58] Field of Search ..................... 251/9, 7, 8, 10, 4; 137/595, 594

[56] References Cited
U.S. PATENT DOCUMENTS

| 192,584 | 7/1877 | Lapham . |
| 1,024,876 | 4/1912 | Barbour .................................. 251/8 |
| 3,330,526 | 7/1967 | Berney . |
| 3,384,336 | 5/1968 | Pulman . |
| 3,550,900 | 12/1970 | Rolin . |
| 3,773,290 | 11/1973 | Mowery . |
| 3,805,830 | 4/1974 | Smith . |
| 3,813,077 | 5/1974 | Kolic . |
| 3,913,882 | 10/1975 | Moulet . |
| 4,034,773 | 7/1977 | Huggins . |
| 4,177,969 | 12/1979 | Sieber-Muller . |
| 4,264,020 | 4/1981 | Loiseau ............................ 251/7 X |
| 4,268,004 | 5/1981 | Gatin . |
| 4,328,834 | 5/1982 | Oates, Sr. et al. . |
| 4,569,502 | 2/1986 | Elliott . |
| 4,607,659 | 8/1986 | Cole . |
| 4,934,406 | 6/1990 | Mayfield . |
| 5,098,060 | 3/1992 | Mogler et al. ....................... 251/7 |

FOREIGN PATENT DOCUMENTS
1237800 6/1960 France ................................ 251/9

OTHER PUBLICATIONS
Declaration of Harry S. Edwards.

Primary Examiner—Martin P. Schwadron
Assistant Examiner—Kevin L. Lee
Attorney, Agent, or Firm—Emrich & Dithmar

[57] ABSTRACT

A pinch valve includes a generally tubular housing including coupling members respectively defining coaxial passages therethrough and adapted for coupling to associated conduits. The passages have tapered seating surfaces which respectively receive the opposite ends of a flexible, resilient, tubular valve member. A two-part housing body is ultrasonically welded together for clamping the coupling members in position and defining a cavity receiving the valve member and an opening into the cavity, the body pivotally supporting a valve lever which projects out of the opening and is movable between an open position leaving the valve member unconstricted and a closed position pinching the valve member closed. In a dual-valve embodiment, two of the valves are supported in parallel relationship at opposite ends of a bridge member.

18 Claims, 1 Drawing Sheet

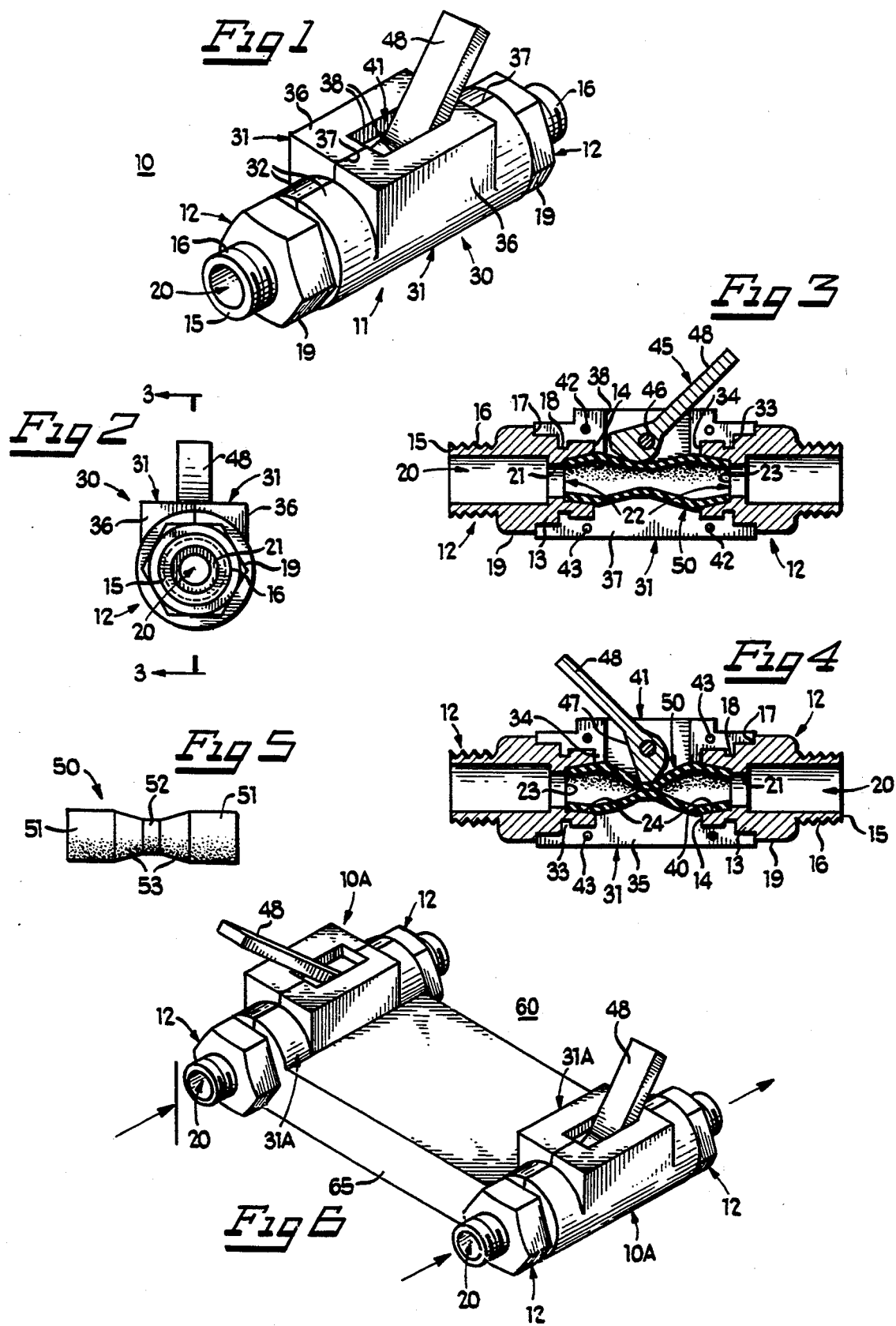

PINCH VALVE

BACKGROUND OF THE INVENTION

1. Field of the Invention

The present invention relates to valve assemblies for controlling fluid flow through a tube and, more particularly, relates to pinch valves for controlling flow through flexible tubes.

2. Description of the Prior Art

In the art of pinch valves a flexible tube through which fluid flows is pinched closed. In many such valves, the tube is pinched by a cam lever pivotally mounted on an associated frame or housing which also supports the tube. Most such valve assemblies are simply clamping devices designed to be slipped over an existing tube. They do not provide an integrated or modular valve assembly which can be readily coupled and decoupled as a unit relative to an associated fluid system in an effectively fluid-tight sealed assemblage. It is known to provide a valve which includes its own tube and is adapted to be connected to other conduits. Many such pinch valves are of relatively complex construction, including either complex lever mounting and/or biasing arrangements or complex frame or housing constructions, and/or they do not provide a closed modular construction which protects the tube.

SUMMARY OF THE INVENTION

It is a general object of the invention to provide an improved pinch valve which avoids the disadvantages of prior pinch valves while affording additional structural and operating advantages.

An important feature of the invention is the provision of a pinch valve which is of modular construction, so that it can be readily coupled and decoupled, as a unit, relative to an associated fluid system.

A further feature of the invention is the provision of a pinch valve of the type set forth, which includes a substantially closed cylindrical housing confining a flexible tubular valve member in a fluid-tight sealed arrangement and mounting an associated valve lever for controlling the valve.

Still another feature of the invention is the provision of a pinch valve of the type set forth which is of simple and economical construction.

A still further feature of the invention is the provision of a pinch valve of the type set forth which is positively moved to open and closed conditions and which cannot be shifted from the closed position by pressure in the fluid system.

Another feature of the invention is the provision of a pinch valve of the type set forth, which is not susceptible to corrosion.

In connection with the foregoing feature, another feature of the invention is the provision of a pinch valve of the type set forth, which includes a split housing which can be readily fabricated by molding and is assembled together by ultrasonic welding.

Still another feature of the invention is the provision of a modular valve apparatus which includes plural pinch valves.

These and other features of the invention are attained by providing a pinch valve comprising: a housing defining two passages respectively opening at spaced-apart locations on the housing, the housing including means defining a cavity between the passages and an opening into the cavity, coupling means on the housing for coupling to associated conduits for communication respectively with the passages, a flexible resilient tubular valve member disposed in the cavity and having end portions respectively communicating with the passages in fluid-tight relationship therewith, and a lever pivotally mounted in the housing and having an actuator end disposed for engagement with the valve member and a handle end extending outwardly through the opening, the lever being pivotally movable between an open position wherein the valve member is substantially unconstricted for accommodating free flow of fluid therethrough and a closed position pinching the valve member to a closed condition for blocking the flow of fluid therethrough, the actuator end being shaped and dimensioned so that when the lever is in the closed position fluid pressure in the valve member will tend to retain the lever in the closed position.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there are illustrated in the accompanying drawings preferred embodiments thereof, from an inspection of which, when considered in connection with the following description, the invention, its construction and operation, and many of its advantages should be readily understood and appreciated.

FIG. 1 is a perspective view of a pinch valve module constructed in accordance with and embodying the features of a first embodiment of the present invention and illustrating the valve in its open condition;

FIG. 2 is a slightly reduced end elevational view of the pinch valve module of FIG. 1;

FIG. 3 is a view in vertical section taken along the line 3—3 in FIG. 2;

FIG. 4 is a view similar to FIG. 3 and illustrating the valve in its closed condition;

FIG. 5 is a side elevational view of the valve member of the module of FIG. 1; and FIG. 6 is a perspective view of a dual valve module in accordance with the present invention.

DESCRIPTION OF THE PREFERRED EMBODIMENTS

Referring to FIGS. 1-4, there is illustrated a pinch valve module, generally designated by the numeral 10, constructed in accordance with the present invention. The module 10 includes a housing 11, which includes two coupling members 12 supported in a split body 30 which includes a pair of body members 31, all cooperating to form an elongated, generally tubular housing 11. The coupling members 12, which are of identical construction, are respectively disposed at opposite ends of the housing 11 and are preferably molded of a suitable plastic material. Each of the coupling members 12 include a cylindrical body 13 terminating at a circular inner end 14 and a circular outer end 15. An externally threaded coupling nipple 16 is formed adjacent to the outer end 15 and is adapted for threaded engagement with an internally threaded fitting of an associated conduit (not shown) of a fluid handling system. Formed in the outer surface of the coupling member 12 intermediate its ends is an annular shoulder 17, and formed adjacent to the inner end 14 is a circumferential groove 18. The outer surface of the coupling member 12 between the nipple 16 and the shoulder 17 defines a hexagonal gripping surface 19 for receiving an associated tool to facilitate assembly of the module 10 in an associated fluid handling system.

A cylindrical passage 20 is formed axially through each coupling member 12, the passage 20 having a reduced-diameter portion intermediate its ends defined by a radially inwardly extending annular flange 21. The inner end of the passage 20 defines a seat 22, which includes an annular shoulder 23 formed on the inner end of the flange 21 and a tapered or frustoconical surface portion 24 which converges from the inner end 14 of the coupling member 12 to the shoulder 23.

The coupling members 12 are supported and spaced apart by the body 30, the body members 31 of which are of identical construction and are arranged as mirror images of each other, and are preferably molded of a suitable plastic material. More specifically, each of the body members 31 includes a generally semi-cylindrical portion 32 which is provided with two radially inwardly extending, semi-annular flanges 33, respectively disposed adjacent to the opposite ends of the body member 31. Respectively spaced axially inwardly from the flanges 33 are radially inwardly extending part-annular flanges 34. Extending axially between the flanges 34 at one side of the body member 31 is a thickened, generally triangular support portion 35 (FIG. 4). Disposed on the outer surface of the body member 31 on the diametrically opposite side from the support portion 35 is a generally rectangular projection 36. Formed on one side of the body member 31 is a flat, planar side face 37 which lies in a diametrical plane of the body member 31 and extends the length thereof. A rectangular recess 38 is formed in the side face 37 in the region of the rectangular projection 36 and extends axially between the flanges 34 and extends radially from the center of the body member 31 to the outer projection 36.

In assembly, the body members 31 are joined with the side faces 37 thereof disposed in abutting face-to-face relationship to form the body 30, which encircles and supports the inner ends of the coupling members 12. More specifically, as can best be seen in FIGS. 3 and 4, the opposite ends of the body 30 are respectively seated against the coupling member shoulders 17, the flanges 33 are respectively seated in the coupling member grooves 18, and the flanges 34 respectively lie against the inner ends 14 of the coupling members 12 to accurately position the coupling members 12 in axially spaced-apart relationship with the passages 20 thereof arranged coaxially. It will be appreciated that the body members 31 cooperate, when joined in their assembled condition, to define a generally cylindrical cavity 40 extending between the coupling members 12 in alignment therewith, while the rectangular recesses 38 in the side faces 37 cooperate to define a rectangular opening 41 which extends radially into the body 30 for communication with the cavity 40.

Each of the body members 31 has two pins 42 projecting perpendicularly from its side face 37 and two cylindrical holes 43 formed in the side face 37. Preferably, the pins 42 and the holes 43 are positioned at the four corners of an imaginary rectangle, with the two pins 42 and the two holes 43 being respectively disposed on opposite sides of the longitudinal axis of the body 30 and on opposite sides of the transverse midplane which bisects the longitudinal axis. This arrangement permits the body members 31 to be formed from the same mold. In assembly, the two pins 42 of one body member 31 are respectively received in the two holes 43 of the other body member 31 and are secured thereto, as by ultrasonic welding. It will be appreciated that the parts are so dimensioned that, when thus assembled, the body members 31 cooperate securely to clamp the coupling members 12 in place and to prevent axial movement of the coupling members 12 and body members 31 relative to each other.

The module 10 also includes a lever 45 which is mounted for pivotal movement about a pivot pin 46 which extends transversely of the opening 41 and has the opposite ends thereof respectively journalled in sockets (not shown) respectively formed in the rectangular recesses 38. The lever 45 has a cam end 47 which projects inwardly of the body 30 and a handle end 48 which extends outwardly through the opening 41 for access by a user.

Referring also to FIG. 5, the module 10 also includes an elongated, flexible, resilient, tubular valve member 50, which is formed of a suitable elastomeric material. The valve member 50 has circularly cylindrical end portions 51, a reduced-diameter cylindrical neck portion 52 and tapered, generally frustoconical transition portions 53 interconnecting the neck portion 52 and the end portions 51. The valve member 50 is disposed in the cavity 40, with its end portions 51 respectively seated in the seats 22 of the coupling members 12 for communication with the passages 20. The tapered seating surfaces 24 are dimensioned so as to slightly compress the cylindrical end portions 51 and provide a wedge fit thereof in the seats 22, thereby effectively to provide a fluid-tight seal between the valve member 50 and the coupling members 12. The sealing force will increase with the internal pressure in the valve member 50. The support portions 35 of the body members 31 cooperate to define a support which is shaped to matingly engage the central portion of the valve member 50 to provide a support therefor.

In operation, the lever 45 is pivotally moveable between an open position, illustrated in FIG. 3, and a closed position, illustrated in FIG. 4. The parts are so dimensioned that when the lever 45 is in its open position, the cam end 47 thereof just touches the valve member 50 but does not constrict it, so that the valve member 50 is in an open condition, permitting free flow of fluid therethrough. When the lever 45 is disposed in its closed position, the cam end 47 engages the neck portion 52 of the valve member 50 and cooperates with the support portions 35 to pinch the neck portion 52 therebetween to a closed condition, blocking the flow of fluid through the valve member 50.

The cam end 47 of the lever 45 is so shaped and dimensioned that, as the lever 45 is moved to its closed position, it effectively moves past an "over center" position, so that it can be left in the closed position and will not tend to move back to the open position. More specifically, fluid pressure in the valve member 50 will tend to expand the valve member 50 against the cam portion 47 in such a way as to urge the lever 45 toward its closed position, rather than away from it.

It is a significant aspect of the invention that the body members 31 cooperate with the coupling members 12 to provide a substantially closed housing 11 which substantially confines and securely mounts the valve member 50 in fluid communication with the passages 20. Thus, the valve member 50 is substantially protected in use. Furthermore, the threaded nipple 16 provide for quick and convenient coupling of the valve module 10, as a unit, in an associated fluid handling system. The valve module 10 does not have to be threaded over or fitted around an existing tube in such a system, as is the case with many prior art clamp-tight devices.

Because the valve module 10 is substantially of plastic and elastomeric construction, it is not susceptible to corrosion, which can interfere with the operation of many prior art valves, particularly in water plumbing systems. It will be appreciated that the valve module 10 could be used as a shut off valve in a water plumbing system in place of the handwheel-operated shut off valves which are typically used on the water inlet lines to faucets in household fixtures, such as sinks, showers, tubs and the like. The valve module 10 can be quickly and easily operated in an emergency, such as in the case of a serious leak, with a simple flick of the lever 45. There is no need for multiple turns, as in the case of a handwheel-operated valve, nor is there any chance of the valve module 10 being stuck or frozen by rust, corrosion or the like.

Referring to FIG. 6, there is illustrated a dual valve module 60, which includes two pinch valve modules 10A arranged in parallel, side-by-side relationship. Each of the pinch valve modules 10A is substantially identical to the pinch valve module 10 described in connection with FIGS. 1–5, except that the inner or facing ones of the body members 31A are respectively unitary with the opposite ends of a rectangular bridge plate 65, which interconnects the valve modules 10A. In the illustrated embodiment, one of the pinch valve modules 10A is disposed in its closed condition, while the other is disposed in its open condition. It will be appreciated that the dual valve module 60 is particularly advantageous for use in connection with water plumbing systems, since the valve modules 10A can respectively be connected to hot and cold water supplies to a faucet, or the like.

While, in the illustrated embodiments, the coupling members 12 have been disclosed as discrete from the body members 31, it will be appreciated that, if desired, the coupling members 12 could, respectively, be molded unitary with the body members 31. Also, while the body members 31 have been disclosed as joined by ultrasonic welding, it will be appreciated that other joinder techniques could be utilized.

From the foregoing, it can be seen that there has been provided an improved, modular pinch valve apparatus which is of simple and economical construction, and which can be simply and easily coupled and decoupled, as a unit, in an associated fluid-handling system.

I claim:

1. A pinch valve comprising: a housing defining two passages respectively opening at spaced-apart locations on the housing, said housing including a portion defining a cavity between said passages and an opening into said cavity, couplings on said housing for coupling to associated conduits for communication respectively with said passages, a flexible resilient tubular valve member disposed in the cavity and having end portions respectively communicating with said passages in fluid-tight relationship therewith, said housing including portions defining seats respectively disposed in said passages adjacent to said cavity, each of said seats including a generally frustoconical, axially outwardly converging portion for receiving an associated end portion of said valve member in a wedge fit for providing a fluid-tight seal therebetween and supporting said valve member completely externally thereof, and a lever pivotally mounted in said housing and having an actuator end disposed for engagement with said valve member and a handle end extending outwardly through said opening, said lever being pivotally movable between an open position wherein said valve member is substantially unconstricted for accommodating free flow of fluid therethrough and a closed position pinching said valve member to a closed condition for blocking the flow of fluid therethrough, said actuator end being shaped and dimensioned so that when said lever is in said closed position fluid pressure in said valve member will tend to retain said lever in said closed position.

2. The pinch valve of claim 1, wherein each end portion of said valve member is substantially circularly cylindrical in shape in its unconstrained rest condition.

3. The pinch valve of claim 1, wherein said valve member includes a reduced-diameter neck portion and two tapered transition portions respectively connecting said end portions to said neck portion.

4. The pinch valve of claim 1, wherein each of said coupling means includes an externally threaded portion on the adjacent portion of said housing.

5. The pinch valve of claim 1, wherein said housing is closed except for said opening and the open ends of said passages.

6. A pinch valve comprising: an elongated generally tubular housing, two discrete coupling members respectively defining coaxial passages therethrough which respectively open at opposite ends of said housing, said coupling members respectively including coupling portions for coupling to associated conduits for communication respectively with said passages, said housing including two discrete body portions each extending lengthwise of said housing, means fixedly securing said body portions together along a joint extending axially of said housing in an assembled condition for cooperation to define a cavity between said coupling portions and an opening extending generally perpendicular to the axis of said passages and communicating with said cavity, said body portions in their assembled condition cooperating to encircle and clamp said coupling members in place, each of said coupling portions including means defining a seat disposed in the corresponding passage adjacent to said cavity, a flexible resilient tubular valve member disposed in said cavity and having end portions respectively seated against said seats for communication with said passages, and a lever pivotally mounted in said housing and having an actuating end disposed for engagement with said valve member and a handle end extending outwardly through said opening, said lever being pivotally movable between an open position wherein said valve member is substantially unconstricted for accommodating free flow of fluid therethrough and a closed position pinching said valve member to a closed condition for blocking the flow of fluid therethrough.

7. The pinch valve of claim 6, wherein each of said coupling portions comprises a discrete coupling member, said body portions cooperating in their assembled condition securely to clamp said coupling members in spaced-apart relationship with said passages substantially coaxial.

8. The pinch valve of claim 7, wherein each of said coupling members has a groove in the outer surface thereof, and each of said body portions has flanges respectively receivable in said grooves for positioning said coupling members and preventing axial movement thereof.

9. The pinch valve of claim 6, wherein said housing includes a support portion disposed opposite said lever for supporting said valve member.

10. The pinch valve of claim 6, wherein each of said body portions includes at least one pin projecting therefrom and at least one socket therein, with the pin of one body portion being disposed in the socket of the other body portion for joining said body portions together.

11. The pinch valve of claim 10, wherein said pins are ultrasonically welded in said sockets.

12. The pinch valve of claim 10, wherein each of said body portions includes two of said pins and two of said sockets, with said body portions being constructed substantially as mirror images of each other.

13. Pinch valve apparatus comprising: two elongated generally tubular housings; each of said housings including means defining two coaxial passages respectively opening at opposite ends of said housing, means defining a cavity between said passages and an opening into said cavity extending generally perpendicular to the axis of said passages, coupling means at the opposite ends of said housing for coupling to associated conduits for communication respectively with said passages, means for defining seating surfaces respectively disposed in said passages adjacent to said cavity, a flexible resilient tubular valve member disposed in said cavity and having end portions respectively seated against said seats for communication with said passages, and a lever pivotally mounted in said housing and having an actuator end disposed for engagement with said valve member and a handle end extending outwardly through said opening, said lever being pivotally movable between an open position wherein said valve member is substantially unconstricted for accommodating free flow of fluid therethrough and a closed position pinching said valve member to a closed condition for blocking the flow of fluid therethrough; and bridge means interconnecting and supporting said housings in parallel arrangement.

14. The apparatus of claim 13, wherein each of said housings includes two discrete body portions, and means fixedly securing said body portions together in an assembled condition, said bridge means having ends respectively integral with one of said body portions in each of said housings.

15. The apparatus of claim 14, wherein each of said housings includes two discrete coupling members respectively defining said passages, said body portions of each said housing in the assembled condition thereof cooperating securely to clamp said coupling members in spaced-apart relationship with said passages substantially coaxial.

16. The apparatus of claim 13, wherein each of said coupling means includes an externally threaded portion on the adjacent end of the associated housing.

17. The apparatus of claim 13, wherein each of said housings is closed except for said openings and the open ends of said passages.

18. The apparatus of claim 13, wherein each of said levers pivots about an axis disposed substantially perpendicular to the axes of said passages and to the directions of said openings.

* * * * *